No. 715,537. Patented Dec. 9, 1902.
F. BEDELL.
COMPOSITE SYSTEM OF ELECTRICAL TRANSMISSION.
(Application filed Mar. 20, 1900.)

(No Model.) 4 Sheets—Sheet 1.

Witnesses:
Raphael Netter
C. D. Morrill

Frederick Bedell Inventor
by E. M. Bentley Att'y

No. 715,537. Patented Dec. 9, 1902.
F. BEDELL.
COMPOSITE SYSTEM OF ELECTRICAL TRANSMISSION.
(Application filed Mar. 20, 1900.)
(No Model.) 4 Sheets—Sheet 2.
Fig. 9
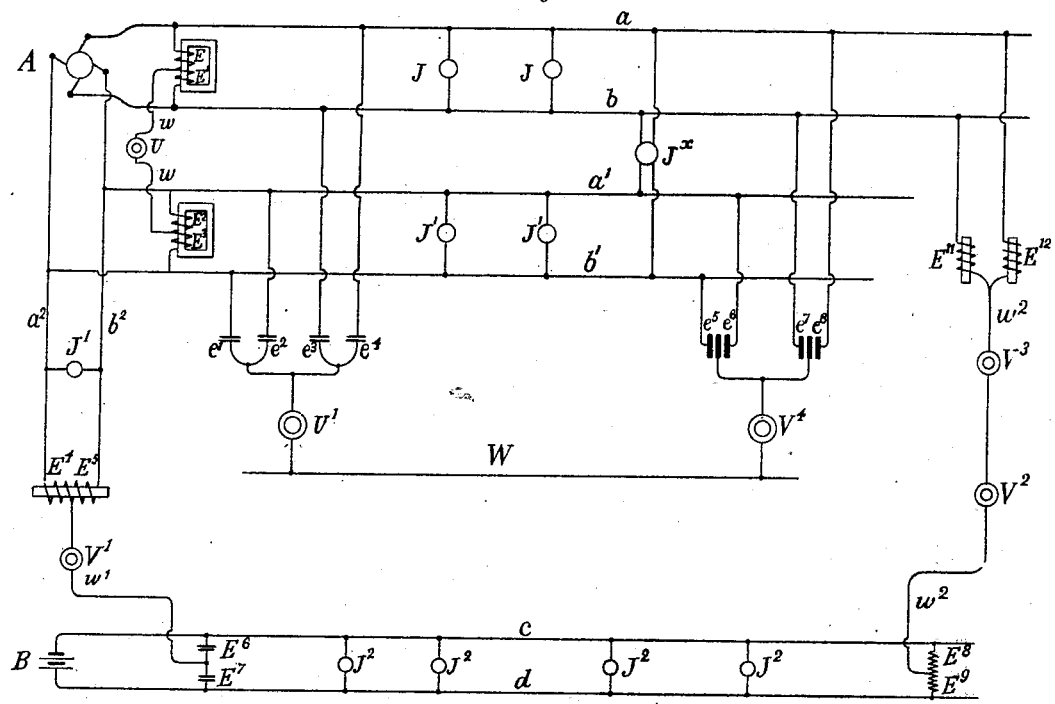
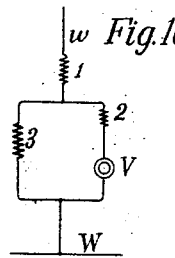
Fig. 10
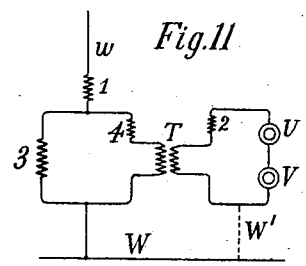
Fig. 11  Fig. 12
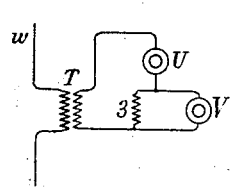
Fig. 13
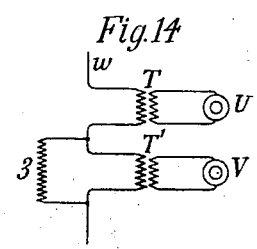
Fig. 14  Fig. 15
Witnesses:
Raphael Netter
C. D. Morrill
Frederick Bedell Inventor
by E. M. Bentley Atty No. 715,537. Patented Dec. 9, 1902.
F. BEDELL.
COMPOSITE SYSTEM OF ELECTRICAL TRANSMISSION.
(Application filed Mar. 20, 1900.)
(No Model.) 4 Sheets—Sheet 3.
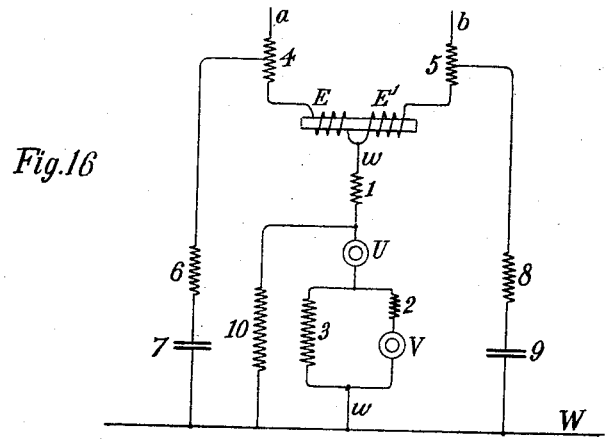
Fig. 16
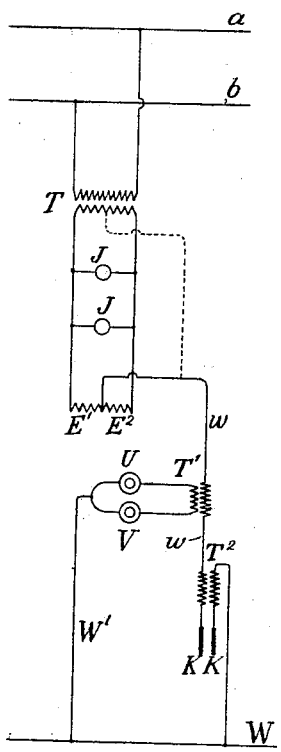
Fig. 17
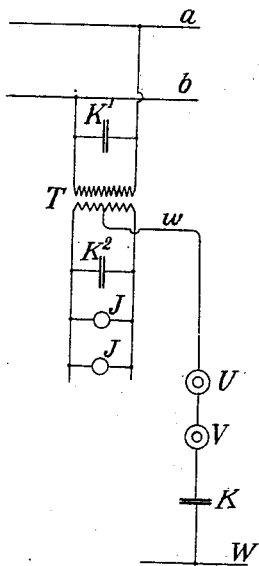
Fig. 18
Fig. 19
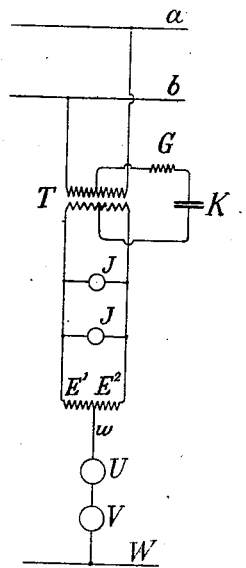
Fig. 20
Fig. 21
Witnesses:
Raphael Netter
C. D. Morrill
Frederick Bedell Inventor
by E. M. Bentley Atty No. 715,537. Patented Dec. 9, 1902.
F. BEDELL.
COMPOSITE SYSTEM OF ELECTRICAL TRANSMISSION.
(Application filed Mar. 20, 1900.)
(No Model.) 4 Sheets—Sheet 4.

Witnesses:
Raphael Netter
C. D. Morrill

Frederick Bedell Inventor
by E. M. Bentley Att'y

UNITED STATES PATENT OFFICE.

FREDERICK BEDELL, OF ITHACA, NEW YORK.

COMPOSITE SYSTEM OF ELECTRICAL TRANSMISSION.

SPECIFICATION forming part of Letters Patent No. 715,537, dated December 9, 1902.

Application filed March 20, 1900. Serial No. 9,350. (No model.)

*To all whom it may concern:*

Be it known that I, FREDERICK BEDELL, a citizen of the United States, residing at Ithaca, county of Tompkins, State of New York, have invented certain new and useful Improvements in Composite Systems of Electrical Transmission, wherein currents of a differing character are transmitted over the same conductor, of which the following is a specification, and which is illustrated in the accompanying drawings, wherein—

Figure 1:
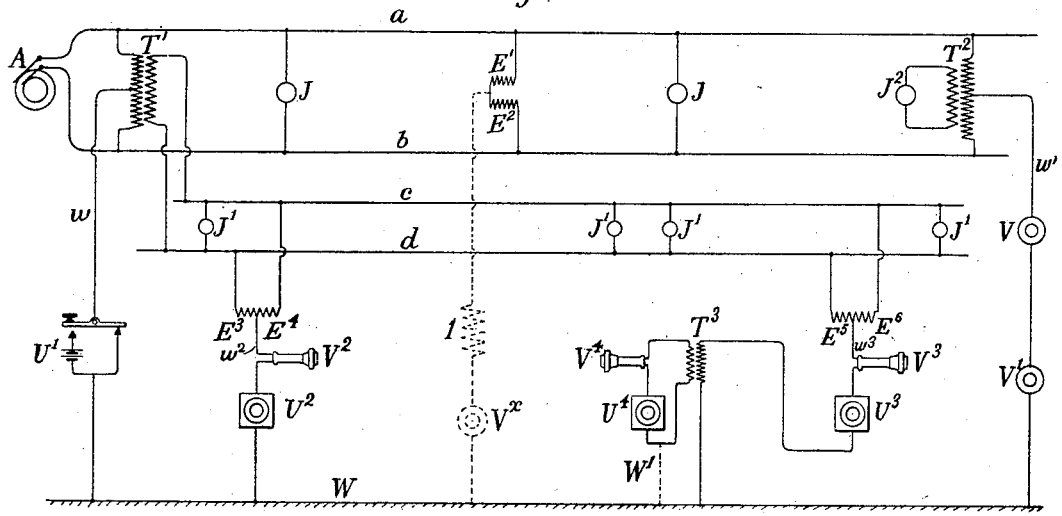
Figure 2:
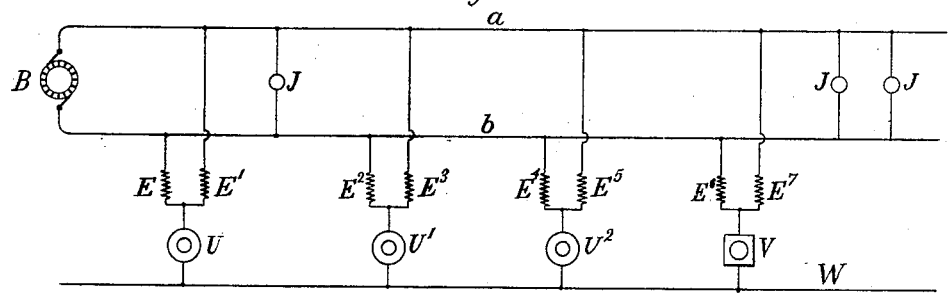
Figure 3:
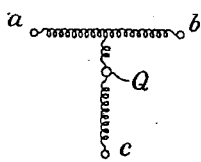

Figure 1 is a general diagram illustrating my invention. Fig. 2 illustrates an application of the invention to direct-current systems. Figs. 3 to 8 show different ways of applying the same to a multiphase alternating system. Fig. 9 shows a modification. Figs. 10 to 16 illustrate different ways of avoiding disturbing effects by shunting. Figs. 17 to 21 illustrate different connections for primary and secondary circuits. Figs. 22 to 27 show different forms of adjusting apparatus.

My invention consists in the transmission over the same conductors of electrical energy by means of maintained currents and intelligence by non-maintained or variable currents or currents otherwise fitted for transmitting intelligence.

More particularly, the invention consists in a method of and means for utilizing the constant-potential mains of an alternating or a direct current distribution system for the transmission of intelligence by any suitable means, such as telephonic or telegraphic apparatus employing current derived from any desired source and applied by transmitting apparatus, whence it is conveyed to one or more suitable receivers at a distant point. In my system I apply to the said main conductors of a distribution system (which I may term the "transmitting-line") at a sending-station any suitable telegraphic or telephonic current by means of a local circuit, (which I may term a "sending-circuit,") and at the receiving-point I derive this telephonic or telegraphic current from the said transmitting-line by a second local circuit, (which I may term a "receiving-circuit.") The "sending apparatus" will be included in the said sending-circuit and the "receiving apparatus" in the receiving-circuit, and the two circuits will be completed by the ground or a separate return wire. Ordinarily the sending and receiving circuits will contain both sending and receiving apparatus and each of the respective circuits will be a receiving or sending circuit with respect to the other. I will also for convenience employ the term "communication-circuit" to include both a receiving and a sending circuit, it being understood that the communication-circuit does not serve to transmit the power-current of the main distribution-circuit, that being confined to the transmission-lines only. It will also be convenient to employ the term "communication apparatus" to distinguish the apparatus employed for communicating intelligence from that employed for transmitting and utilizing the power-current for electric lighting, motors, &c.

The several features of my invention may be distinguished as follows: First, I provide means for applying communication-circuits to a constant-potential transmission-line; second, I provide means whereby the receiving and sending circuits may be applied to a transmission-line at points of equal potential; third, I further provide means whereby any rising and falling of the transmission-line potential will affect alike the point of application of the receiving and sending circuits, the potential changes of the two points being simultaneous in sequence or phase and in wave form or absolute value from instant to instant; fourth, I provide in carrying out my invention shunts or by-paths around the communication apparatus, whereby any power-current which might flow into the communication-circuit by reason of leakage, induction, lack of balance, or other cause may be entirely or in part shunted around the communication apparatus to avoid disturbance therein; fifth, I further provide means whereby the communication apparatus may be in a circuit electrically disconnected but in inductive relation to the communication-circuit; sixth, I also provide means whereby the communication-circuits may be insulated from the transmission-line; seventh, means also are provided whereby the communication-circuit may be insulated from the ground or return circuit by interposed insulating inductive apparatus, whereby electrical connection between the transmission-line and the communication-circuit and also between the latter and the return-circuit is avoided, and a ground return may hence be employed for communication without grounding the transmission-circuit; eighth, finally I provide means for adjusting the resistances and inductive action of the several circuits.

I would also add that in this specification and claims the word "induction" will include both electrostatic and electromagnetic induction, and the terms "inductive action," "inductive apparatus," and similar expressions will be employed in like manner. This is due to the fact that in certain applications of my invention it is immaterial to the means employed whether this inductive action is electrostatic or electromagnetic and because I have as yet been unable to ascertain with certainty to what extent certain phenomena (e. g., the communication between primary and secondary of transformer T in Fig. 18) which I have observed in practice, are due to one or the other of the two causes mentioned. Furthermore, with respect to the connection of one circuit or device to another said connection may be electrically inductive or conductive, and it is in the sense that the words "connected," "applied," and like terms are to be understood.

I, moreover, employ various devices for "impeding" currents, by which I refer to apparatus of any usual or preferred kind which will check or restrain the flow of current and which may also be, as hereinafter described, selective in character, so as to be more or less effective in its action, according to the nature of the current applied thereto, it being moreover understood that these "impeding devices" may be simple resistances or may have an inductive action either electrostatic (e. g., condensers) or electromagnetic.

Turning to Fig. 1, A is an alternating-current generator of the monophase type supplying current at constant potential to the line conductors $a\ b$ and operating the translating devices J J, directly and indirectly supplying current to the secondary circuits of transformers T' and T², to which are respectively connected the translating devices J' and J². A sending-circuit $w$ is shown at the left of the figure containing transmitting apparatus, (indicated by a telegraph-key U'.) At the right of the figure is a corresponding receiving-circuit $w'$, containing the telegraphic receivers V and V'. Both of these circuits are connected one end to the ground or return circuit W and at the other end $w$ is connected to an intermediate point in the primary coil of transformer T' and $w'$ is connected to an intermediate point in the primary circuit of transformer T². Thus the current from the communication-circuit $w$ will be transmitted in opposite directions through the primary coil of T', thence through the transmission-lines $a\ b$ in parallel to the intermediate point of the primary coils T², and thence by receiving-line $w'$ through the receiving apparatus to ground. By this means the sending and receiving circuits are connected to points of equal potential on the transmitting-circuit, and in consequence there will be no flow of the maintained power-current from the distribution system through the telegraph apparatus to interfere with its normal function of transmitting intelligence. The telegraph apparatus may obviously be replaced by signaling apparatus of any kind—such, for example, as a magneto and a call-bell for use in a telephone system. Moreover, additional telegraphic apparatus $V^\times$ may be connected to the transmission-circuit through impedance-coils E' E², and an impedance coil or device 1 may be employed in series with $V^\times$ to modify the communication-current and likewise to restrain the power-current, which might tend to flow in the event of a grounded circuit on the line or any other disarrangement of the system, acting thus as a safety device. The receiver $V^\times$ will then be operated in multiple with V and V' from the transmitter U'. It may be added that the impeding device 1 may act chiefly or solely as a safety device and may be of a character to impede current of the character employed in the power system, while offering comparatively little obstruction to the communication-current. Telephone apparatus may be applied to the transmission-circuit in a similar manner. Thus at an intermediate point between the impeding-coils $E^3$ $E^4$, connected in series to the secondary line conductors $c\ d$, is connected the sending-circuit $w^2$, containing a telephone-receiver $V^2$ and a telephone-transmitter $U^2$. The corresponding apparatus $V^3$ and $U^3$ at the receiving-station is similarly connected between coils $E^5$ and $E^6$, and, if desired, similar apparatus may be connected in the secondary circuit of a transformer $T^3$, as indicated at $V^4$ and $U^4$. This secondary circuit may, if desired, be connected to ground, as indicated by dotted lines W', by which means the communication apparatus is at all times at zero potential and the operator is not subjected to danger in the event of a high potential being impressed upon the communication-circuit by defective circuits or other circumstance. In this manner the telephone apparatus is connected to the transmission-line at points of equal potential, so as to remain unaffected by the power-current. I find it desirable, however, that these points of application should not only be of the same potential, as that term is ordinarily understood, but also points of like phase and wave form. For example, I have found that if $E^3$ and $E^4$ are non-inductive resistances, while $E^5$ and $E^6$ are separate coils with electromagnetic induction, but not mutually inductive, there will be a buzzing in the telephone sufficient to interfere seriously with conversation. This is true even though $E^3$ and $E^4$ are exactly balanced, and $E^5$ and $E^6$ are also balanced with respect to each other. On the other hand, all of the four coils need not be alike. The system may be operated, for example, if one pair of coils is non-inductive and the other pair mutually inductive; but I prefer that each pair shall be mutually inductive, for thereby the points of application become of the same phase and wave form or closely approximate thereto. I have also found that a small phase difference between the points of application may be caused by unequal leakage in the two pairs of coils, and that the matter is also affected by the permeability and degree of lamination of the iron, also by its saturation and its hysteresis loss, these features affecting the wave form. A difference in wave form, even if the points of application are practically of the same phase and potential, will give a different tone in the telephone, and may even become the occasion of serious difficulty.

To avoid or minimize the troubles mentioned above, I adjust the resistance and induction of the several circuits, and when electromagnetic devices with iron cores are employed I arrange the core and winding so as to establish a proper relation between the dimensions of the core and the number of turns in the respective winding. Thus it is desirable in order to equalize any magnetic leakage in the two sections of differentially-wound impeding-coils to equalize and balance them and to avoid saturation in the core of one pair of coils greatly in excess of that in the corresponding pair or above the saturation-point of the iron. By arranging and adjusting with respect to the foregoing features it is possible to avoid harmonics and unequal distortion of the wave form, and thereby converse successfully over telephone apparatus connected to a most irregular and powerful transmission of power-circuit either of the direct or alternating current type.

As regards direct-current circuits the resistances E and E' may also be inductive or not, although preferably inductive and also mutually inductive and of either low or high resistance. When the source of direct current is a storage battery, this is not so essential; but it is important in any case where there are sudden fluctuations of line potential due to the opening and closing of circuits and irregular load. For example, when a dynamo or rotary converter is employed the passing of the commutator-brushes from one bar to the next and mechanical irregularities in the engine or other prime mover and in the connecting mechanism give rise to rapid variations in line potential. These variations may be minute and of no consequence so far as regards the power-transmission, but tend to affect very seriously such a delicate instrument as a telephone. Thus with respect to a telephone a system would be one of rapidly-varying potential, which with respect to electric lamps and motors would be one of constant potential, and it is to eliminate the effect of such variations that I employ the inductive impeding-coils, and for this purpose I have found them effective. In making each pair of impeding-coils mutually inductive and balanced it is to be observed that whereas the coils may be highly inductive with regard to current flowing through them in series between the lines $a$ and $b$ they will be non-inductive with respect to the communication-current flowing through them in parallel from an intermediate point. In this manner means are provided whereby the potentials of the points of application of the sending and receiving circuits are equal, notwithstanding the flow of maintained current through the conductors $a\ b$ and $c\ d$, and notwithstanding the existence on these conductors of a pressure suitable for power purposes, these currents and pressures being relatively enormously great as compared with the currents and pressures involved in telephonic or telegraphic apparatus. When the ground is employed for the return-circuits W, these two equal potential-points are at zero potential— i. e., the potential of the ground—but when an insulated conductor W is employed its potential and the potential of the sending and receiving circuits and their respective points of application may be above or below the potential of the earth, as would be the case were one terminal of the generator A grounded either through accident or design. The communication apparatus is, however, free from disturbance from the power-current on account of the fact that the sending and receiving circuits are applied at points of equal potential, as already explained. I am able to obtain this equality of potential even with the maintained power-current flowing in the lines $a\ b$ and despite the "line-drop" on these conductors in the manner already stated, for the power-currents in the conductor $a$ and in the conductor $b$ are in opposite directions, and this is true whether alternating or direct currents be employed. Hence when the drop along one conductor is positive the drop along the other conductor is negative, and the absolute potential of the points of application of communication-circuits accordingly remains unaffected.

It will be understood that I employ the impeding devices to divide the potential difference impressed at their respective terminals in such a manner as to provide intermediate points in the several impeding devices of the same absolute potential even when these impressed potential differences are unequal and the absolute potentials of corresponding terminals of one polarity differ in value.

In Fig. 2 I have illustrated a direct-current system, with the lines $a\ b$ supplied from a direct-current dynamo B. The transmitters U U' U² include a source of current and are shown connected in parallel between the ground and the intermediate points of respective pairs of impedance-coils, while all of them operate upon a common receiver V. This arrangement may be employed, for example, in a fire-alarm system, each of the transmitters maintaining the circuit normally open and being of any well-known description. It will also be understood that a similar arrangement of transmitters may also be applied to an alternating-current system.

Figure 4:
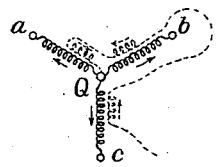
Figure 5:
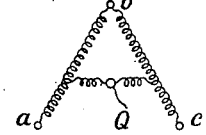
Figure 6:
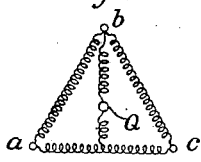
Figure 7:
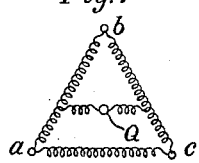
Figure 8:
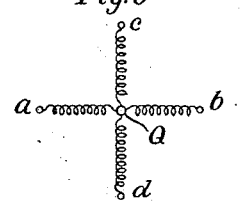

In a multiphase alternating system the points of application of receiving and sending circuits may be at the electrical centers of multiphase alternating coils of different kinds. Thus in Fig. 3 the point of application Q is at the electrical center of a T-connected three-phase system of coils, the currents from the point Q splitting and diverging equally and oppositely to the three terminals $a\ b\ c$. In Fig. 4 the point Q is the central or neutral point of a Y-connected system of coils, and, if desired, the current flowing to the point Q may pass through a series of counter-coils corresponding, respectively, to the three branches of the Y, as indicated in dotted line. In Fig. 5 an A-connected system of coils is shown, with the point Q at the center of the bridging-coil. In Figs. 6 and 7 delta-connected coils are shown, with the point Q in a bridging-coil at the electrical center of the delta. In Fig. 8 the point Q is at the electrical center of a balanced two-phase system of coils.

In Fig. 9 I have shown some of the further possibilities of my above-described system. In this figure A is a two-phase alternating-current generator delivering currents of one phase to the transmission-lines $a\ b$ and currents of a different phase to the lines $a'\ b'$ and $a^2\ b^2$. B is a direct-current generator supplying the transmission-mains $c\ d$. Alternating translating devices of the monophase type are shown at J J′ and of the two-phase type at $J^\times$. Direct-current apparatus is indicated at $J^2\ J^2$. A sending-circuit is indicated at $w$ as containing a transmitter U. One terminal is connected to the mains $a\ b$ and the other terminal to the mains $a'\ b'$ through impedance-coils in the manner already described. The circuit is completed, on the one hand, through coils $E^4\ E^5$, receiver V′, and line $w'$ to an intermediate point between condensers $E^6\ E^7$, connected in series across the direct-current mains $c$ and $d$, and, on the other hand, the circuit leads through coils $E^{11}\ E^{12}$ and line $w^2$ to receivers $V^2$ and $V^3$, passing thence to the direct-current mains through coils $E^8$ and $E^9$. Another transmitter U′ has one terminal connected to the condensers $e'$ and $e^2$, joined in series across the mains $a'\ b'$ and also to condensers $e^3\ e^4$, connected in series across mains $a\ b$. The opposite terminal of the transmitter is connected to the return-line W, and at the receiving-station there is a receiver $V^4$, similarly connected to the two-phase mains, but with a somewhat different connection to the condensers, its upper terminal being connected to an intermediate plate of the condenser $e^5\ e^6$ and also to an intermediate plate in the condenser $e^7\ e^8$. The operation of this system will be understood from the explanation which has already been given.

Turning next to Figs. 10 to 15, I will explain various arrangements for shunting the communication apparatus to divert therefrom any power-current which may flow from leakage, lack of symmetry, or other cause. Of these Figs. 11 to 15 show also the method of connecting the communicating apparatus in the secondary circuit of transformers.

In Fig. 10, 3 represents a by-path around the receiver V, there being also a resistance 2 in series with V and a resistance 1 in series with the combination. The resistance, self-induction, and capacity of the circuit containing V and of the branch circuit 3 may be so arranged and adjusted that any leakage-current will be impeded more by the circuit to the transmitter than by the branch circuit. Let us suppose, for example, that the transmission-circuit carries an alternating current at a frequency of sixty cycles, the receiver V being the telephone. In this case 2 may be a non-inductive resistance of high value—say several thousand ohms. The circuit 3 may be inductive with an impedance, however, to the power-current, which is much less than the resistance of 2 and the receiver V. In this case any leakage-current will pass mainly through 3, thereby reducing the current due to leakage, which might otherwise flow through V and minimizing the buzzing in the telephone. The resistances and impedances of the several parts of the circuit are so adjusted, however, that telephonic current of relatively high frequency is impeded by 3 to such an extent that sufficient current passes through V to operate it. The arrangement of the transmitter-circuit and the shunt necessarily depends upon the character of the power-current and that of the communication-current. In the case referred to we have seen that it is desirable to make 2 non-inductive and 3 inductive. Conversely, it may be desirable to make 2 inductive with low resistance and 3 non-inductive with high resistance. Such an arrangement would be employed to advantage with an alternating power-current and a direct-communication current sustained for intervals of time greater than the period of the alternating current. In that case circuits 2 and 3 will act selectively—that is, any leakage-current will be impeded by 2 from passing through the receiver V, but the direct current will pass through 2 rather than 3 because of the low resistance of the former and the high resistance of the latter.

In Figs. 11 to 15 the communication apparatus is in the secondary of a transformer whose primary is connected to the communication-circuit $w$. In Fig. 14 the transmitter and receiver are respectively in the secondaries of separate transformers, and in Fig. 15 they are respectively in independent secondaries of the same transformer.

In Fig. 11 the shunt 3 is connected around the primary of transformer T, there being impeding devices 2 and 4 in the secondary and primary, respectively, just as there is impedance 2 of Fig. 10 in series with receiver V.

In Fig. 12 the by-path 3 includes also condenser C and shunts both transmitter and receiver in the secondary circuit, although it may shunt either one alone, as in Fig. 13 or as in Fig. 14, wherein it shunts the primary of transformer T' of the receiver.

The transformer T of Figs. 11 to 15 may also act as a safety device in case of a ground on the power-line, particularly when such line is a high-potential alternating circuit. If the line potential is impressed on circuit $w$, and hence to a greater or less extent on the primary of transformer T, the core dimension and primary and secondary turns of the transformer may be so adjusted that no dangerous potential will appear in the secondary, for in addition to the normal lower secondary potential, due to a smaller number of secondary turns, a limit can be selected beyond which the secondary potential cannot rise, no matter how high may be the potential on the primary, by reason of the saturation of the iron core. When so desired, this is possible even when the secondary has more turns than the primary.

In Fig. 16 there are also shown by-paths 6 7 and 8 9 shunting receiver V and by-path 10 shunting both receiver and transmitter, 7 and 9 being condensers. It will be understood that these various shunts may be employed separately or in any desired combination and that they may be inductive (either electromagnetically or electrostatically) or non-inductive, according to the nature of the current and apparatus employed.

When the power-current is alternating it is in many cases desirable to employ a resonant shunt-circuit as a by-path, the capacity and self-induction being so adjusted as to tune the shunt-circuit to the fundamental wave of the alternating power-current. A plurality of shunts may likewise be employed tuned, respectively, to the fundamental of the power-current and its several harmonics.

In Figs. 17 and 18 the circuit $w$ is applied to the secondary of transformer T, whose primary is connected to power-mains $a$ $b$. In Fig. 17 the connection is to impeding-coils E' E² or, as shown by dotted lines, directly to the secondary coil. The communication apparatus is in the secondary of transformer T' in circuit $w$ and may also be connected to earth by the conductor W'. Circuit $w$ may be insulated from ground by transformer T², whose coils terminate, respectively, in condenser-plates K, here shown as plates of separate condensers, which may be assembled as the plates of one condenser when preferred. Circuit $w$ is thus completely insulated from the transmission-line, from the communication apparatus, and from the ground. I have found that if the transformer T is employed as in Fig. 17 the conversation is somewhat indistinct, but may be improved by shunting the transformer-coils by condensers, as in Fig. 18, of which one or both may be employed. Circuit $w$ may also be insulated from the ground by condenser K.

A modification of transformer T and T² and condensers is shown in Fig. 19. I find that communication between primary and secondary circuits by the arrangement of apparatus shown in Figs. 17, 18, and 19 is a possibility under favorable conditions, accompanied, however, with such difficulty under ordinary working conditions that in practice I commonly prefer an arrangement in which there is a more powerful inductive action between the primary and secondary, as in Fig. 20, or a conductive connection, as in Fig. 21.

In Fig. 20 the condenser K, with resistance G, connects the primary and secondary coils of the transformer T, the connection being an inductive one through the condenser, which also insulates the coils of the transformer from each other. Fig. 21 shows the same arrangement, with condenser K omitted.

I have already explained my contemplated adjustment of the impeding devices in the several circuits and arrangements already shown. This may be accomplished by any means known to the art and may be as gradual as desired.

Figure 22:
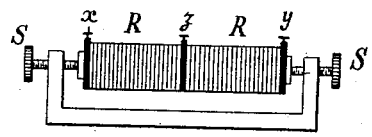
Figure 23:
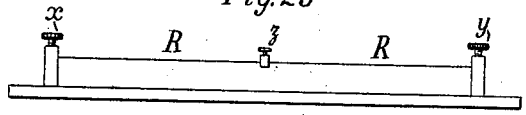
Figure 24:
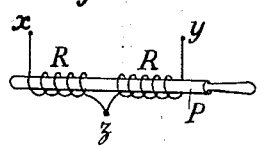
Figure 25:
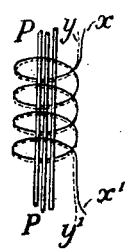
Figure 26:
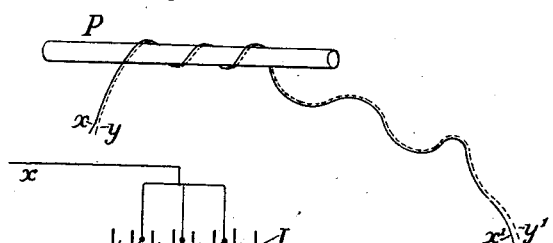
Figure 27:
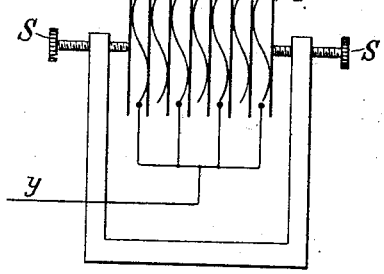

Figs. 22 to 27 show various preferred means of adjustment. In Fig. 22 carbon-plate resistances R have terminals $x$ $y$ with an intermediate terminal $z$ and have their pressure and resistance adjusted by screws S. In Fig. 23 the resistance is simply a wire and the terminal $z$ adjustable longitudinally thereon. In Fig. 24 the mutual and self-induction (electromagnetic) is adjustable by a movable iron core P. In Fig. 25 the same adjustment is secured by varying the number of iron wires P P composing the core. In Fig. 26 the wires $x$ $x'$ and $y$ $y'$ may be wound or unwound on the core P. In Fig. 27 insulation-sheets I are held apart by spring brass condenser-plates, which are adjusted to or from one another by screws S.

What I claim as new, and desire to secure by Letters Patent, is—

1. The combination with a line-circuit, of a source of normally maintained and a source of non-maintained current connected therewith, and translating and receiving apparatus connected to said circuit and adapted to receive maintained and non-maintained currents, respectively.

2. The combination with a circuit for the distribution of electrical energy for lighting, power or similar purposes by means of a maintained current, of a transmitter connected thereto and adapted to operate by means of intelligence-conveying current a suitable receiver connected to said circuit at a distant point.

3. The combination with line conductors of maintained constant potential, of sending and receiving communication-circuits applied thereto at separate points, and a transmitter in said sending-circuit adapted to transmit current to a suitable receiver in said receiving-circuit.

4. The combination with a circuit for transmitting electrical energy for lighting, power or similar purposes by means of a maintained current, of sending and receiving communication-circuits applied thereto at separate points and communication apparatus in said communication-circuits operating by non-maintained currents.

5. The combination with a circuit for transmitting electrical energy for lighting, power or similar purposes by means of a maintained current, of sending and receiving communication-circuits applied thereto at separate points of equal potential and communication apparatus in said communication-circuit operating by non-maintained current.

6. The combination with a circuit for transmitting electrical energy for lighting, power or similar purposes by means of a maintained current, of sending and receiving communication-circuits applied thereto at separate points through impeding devices and communication apparatus in said communication-circuit operated by non-maintained current.

7. The combination with a circuit for transmitting electrical energy for lighting, power or similar purposes by means of a maintained current of constant potential, of sending and receiving communication-circuits applied thereto at separate points of equal potential and communication apparatus in said communication-circuit operated by non-maintained current.

8. The combination with a circuit for transmitting electrical energy for lighting, power or similar purposes by means of a maintained alternating current, of sending and receiving communication-circuits applied thereto at separate points of equal potential and phase, and communication apparatus in said communication-circuit operated by non-maintained current.

9. The combination with a circuit for transmitting electrical energy for lighting, power or similar purposes by means of a maintained alternating current, of sending and receiving communication-circuits applied thereto at separate points of equal potential, phase and wave form, and communication apparatus in said communication-circuit operated by non-maintained current.

10. The combination with a circuit for transmitting electrical energy for lighting, power or similar purposes by means of a maintained alternating current, of sending and receiving communication-circuits applied thereto at separate points through impeding devices, means for regulating said impeding devices so as to adjust the potential, phase or wave form of said points and communication apparatus in said communication-circuit operated by non-maintained current.

11. The combination with a circuit for transmitting electrical energy for lighting, power or similar purposes by means of a maintained alternating current, of sending and receiving communication-circuits applied thereto at separate points, mutually-inductive impeding devices at said points between one or both of said communication-circuits and the two conductors of said transmission-circuit, and communication apparatus in said communication-circuit operated by non-maintained current.

12. The combination with a circuit for transmitting electrical energy for lighting, power or similar purposes by means of a maintained alternating current, of sending and receiving communication-circuits applied thereto at separate points, impeding devices adjustable as to resistance and self-induction between one or both portions of the said communication-circuit and the two conductors of the said transmission-circuit and communication apparatus in said communication-circuit operated by non-maintained current.

13. The combination with a circuit for transmitting electrical energy for lighting, power or similar purposes by means of a maintained current at constant potential, of sending and receiving communication-circuits applied thereto at separate points, impeding devices at sending and receiving points connected across the mains of the said power-circuit and joined at an intermediate point to the respective sending and receiving communication-circuits and communication apparatus in said communication-circuits operated by suitable current.

14. The combination with a circuit for the distribution of electrical energy for lighting, power or similar purposes by means of a maintained current, of telephone transmitting and receiving apparatus connected thereto at distant points, and a return-circuit connecting said transmitting and receiving apparatus.

15. The combination with a circuit for transmitting electrical energy for lighting, power or similar purposes by means of maintained current, of sending and receiving communication-circuits connected thereto and to the ground or return circuit, and likewise to telephone transmitting and receiving apparatus.

16. The combination with a circuit for transmitting electrical energy for lighting, power or similar purposes by means of a maintained alternating current, of sending and receiving communication-circuits applied thereto at separate points, impeding devices connected across the mains of the said transmitting-circuit and joined at an intermediate point to a communication-circuit, communication apparatus in said communication-circuit and an impedance interposed between said apparatus and the said impeding devices.

17. The combination with a circuit for transmitting electrical energy for lighting, power or similar purposes by means of a maintained current at constant potential, of sending and receiving communication-circuits applied thereto at separate points, impeding devices in the circuit formed by the two communication-circuits and the transmitting-line, and telephone transmitting and receiving apparatus also in said circuit.

18. The combination with a circuit for transmitting electrical energy for lighting, power or similar purposes by means of multiphase alternating currents, of sending and receiving communication-circuits applied thereto at separate points through multiphase impeding devices and communication apparatus in said communication-circuit.

19. The combination with a circuit for transmitting electrical energy for lighting, power or similar purposes by means of multiphase alternating currents, of sending and receiving communication-circuits applied thereto at separate points, multiphase impeding devices connected to the several transmission-lines and connected at the electrical center to one of the said communication-circuits and communication apparatus in the said communication-circuits.

20. The combination with a circuit for transmitting electrical energy for lighting, power or similar purposes by means of a maintained current, of sending and receiving communication-circuits applied thereto at separate points, communication apparatus in the said communication-circuits and a shunt for said apparatus.

21. The combination with a circuit for transmitting electrical energy for lighting, power or similar purposes by means of a maintained current, of sending and receiving communication-circuits applied thereto at separate points, communication apparatus in the said communication-circuits and a selective shunt for said apparatus.

22. The combination with a circuit for transmitting electrical energy for lighting, power or similar purposes by means of a maintained current, of sending and receiving communication-circuits applied thereto at separate points, communication apparatus in the said communication-circuits, and one or more selective shunts for said apparatus.

23. The combination with a circuit for transmitting electrical energy for lighting, power or similar purposes by means of alternating currents, of sending and receiving communication-circuits applied thereto at separate points, communication apparatus in the said communication-circuits and one or more resonant shunts for said apparatus tuned with respect to the alternating power-current.

24. The combination with a circuit for transmitting electrical energy for lighting, power or similar purposes by means of a maintained current, of sending and receiving communication-circuits applied thereto at separate points, communication apparatus in the said communication-circuits and selective impeding devices in series with said communication apparatus and also in a shunt around the same.

25. The combination with a circuit transmitting electrical energy for lighting, power or similar purposes, of sending and receiving communication-circuits at separate points, one or both being electrically disconnected but in inductive relation to the said transmission-line, and communication apparatus in said communication-circuit.

26. The combination with a circuit for transmitting electrical energy for lighting, power or similar purposes, by means of a maintained current, of sending and receiving communication-circuits, one or both insulated from the ground or return circuit but applied to the said transmission-line at separate points and communication apparatus in said communication-circuits.

27. The combination with a circuit for transmitting electrical energy for lighting, power and similar purposes, of a communication-circuit and an intermediate circuit connected to the transmission-circuit through impeding devices and in inductive relation to the said communication-circuit.

28. The combination with a circuit for transmitting electrical energy for lighting, power and similar purposes, of a communication-circuit and an intermediate connecting-circuit insulated from the ground or return conductor and in inductive relation to the communication-circuit.

29. The combination with a circuit for transmitting electrical energy for lighting, power, or similar purposes, by means of a maintained current of constant potential, of sending and receiving communication-circuits applied thereto at separate points, means for adjusting the potential of said points, and communication apparatus in said communication-circuit operated by non-maintained current.

In witness whereof I have hereunto set my hand, before two subscribing witnesses, this 15th day of March, 1900.

FREDERICK BEDELL.

Witnesses:
HORACE MACK,
THOMAS TREE.